United States Patent [19]

Glover

[11] Patent Number: 4,924,718

[45] Date of Patent: May 15, 1990

[54] OMNIDIRECTIONAL OSCILLATOR (GLOVER GEAR)

[76] Inventor: Marvin J. Glover, 3900 16th St., NW., #501, Washington, D.C. 20011

[21] Appl. No.: 220,262

[22] Filed: Jul. 18, 1988

Related U.S. Application Data

[63] Continuation-in-part of Ser. No. 923,618, Oct. 27, 1986, Pat. No. 4,757,722.

[51] Int. Cl.$^5$ ............................................. F16H 37/12
[52] U.S. Cl. ............................................. 74/25; 272/50; 272/51
[58] Field of Search .................. 74/25, 52, 63, 86, 5.7, 74/5.22, 799; 272/50, 51

[56] References Cited

U.S. PATENT DOCUMENTS

| | | | |
|---|---|---|---|
| 1,394,083 | 10/1921 | Griffiths | 89/37.02 |
| 2,181,819 | 11/1939 | Radelet et al. | 89/37.02 |
| 2,533,241 | 12/1950 | Goldman | 74/799 |
| 2,960,796 | 11/1960 | Woodrey | 74/25 |
| 3,721,971 | 3/1973 | Gruber | 74/86 |
| 4,015,508 | 4/1977 | Blodgett, Jr. et al. | 89/12 |
| 4,112,411 | 9/1978 | Alais et al. | 340/1 R |
| 4,708,290 | 11/1987 | Osmond | 74/799 |

FOREIGN PATENT DOCUMENTS

| | | | |
|---|---|---|---|
| 81/01396 | 5/1981 | PCT Int'l Appl. | 74/86 |
| 587294 | 1/1978 | U.S.S.R. | 74/52 |

OTHER PUBLICATIONS

Snyder et al., "Real-Time Orthogonal Mode Scanning of the Heart, I. System Design"; *Journal of the American College of Cardiology*; vol. 7, No. 6; Jun. 1986; pp. 1279–1285.

Primary Examiner—Leslie A. Braun
Assistant Examiner—Scott Anchell
Attorney, Agent, or Firm—Joseph Scafetta, Jr.

[57] ABSTRACT

A mechanism for generating oscillatory motion omnidirectionally transforms rotating motion in which the rotating member is continuously rotated unidirectionally into any number of simultaneous arcuate motions intersecting at predetermined angles. This mechanism includes a disk-shaped body rotatably mounted and swept in a circle so that it completes two periods of rotation over the course of one period of sweep. The altitude of the disk-shaped body always intersects a point on an imaginary line, regardless of the angle of inclination of the disk-shaped body. This imaginary line is perpendicular to the circularly swept path of the disk-shaped body at the center of the circularly swept path. Points on the circumferential edge of the disk-shaped body describe an infinite number of arcs as they move around the circularly swept path. These arcs intersect at a common point from an infinite number of angles. Any number of desired arcs intersecting at any angle can be obtained by selecting points on the circumferential edge of the disk-shaped body describing those desired arcs. This apparatus is the basis for improvements in a variety of existing devices such as mixers, grinders, drills, pendulum devices, centrifuges, signal lights, electric shavers, massagers, scanning devices such as ultrasonic, x-ray, radar and computer memory scanners, optical cameras and projectors, dispersing devices, assembly lines, robots, energy bombardment chambers, and amusement rides.

9 Claims, 6 Drawing Sheets

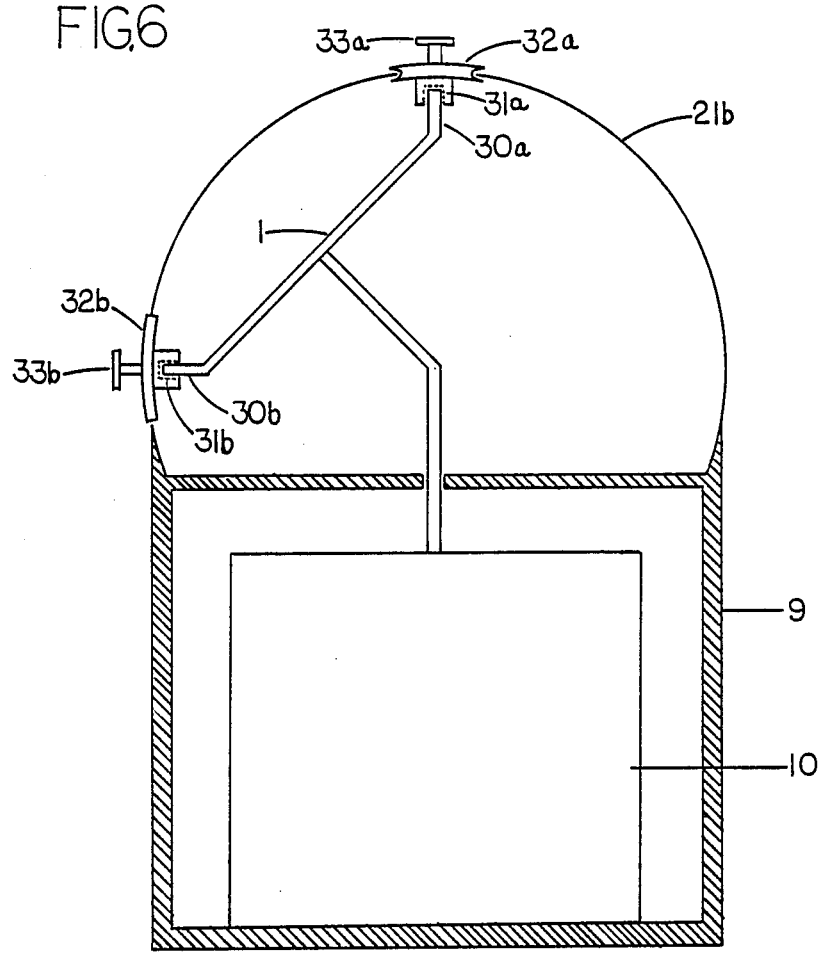
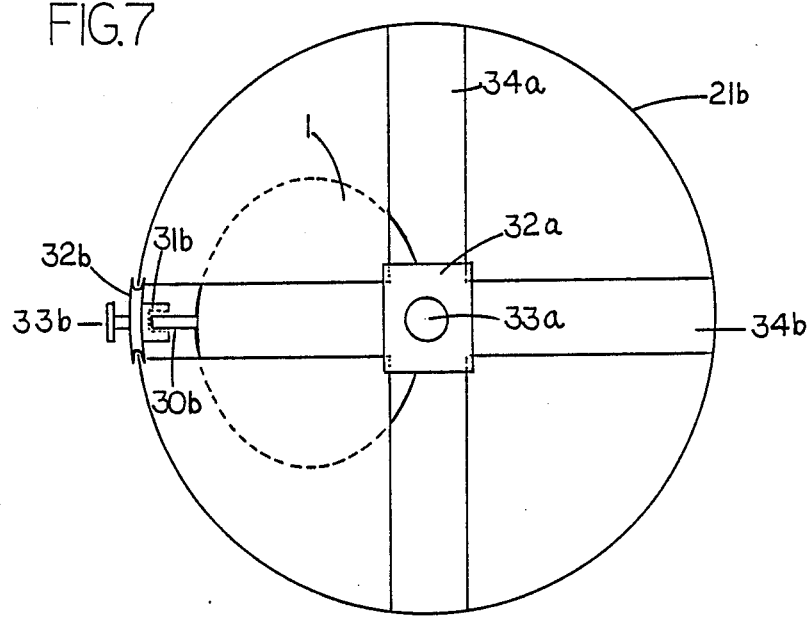

OMNIDIRECTIONAL OSCILLATOR (GLOVER GEAR)

CROSS-REFERENCE TO RELATED APPLICATION

This application is a continuation-in-part of U.S. Pat. No. 4,757,722 issued Jul. 19, 1988.

BACKGROUND OF INVENTION

1. Field of Invention

The present invention relates to mechanisms capable of producing multiple oscillating outputs having vectors all intersecting through a common point at preselected angles, and particularly to continuously variable oscillating outputs having vectors.

2. Description of the Related Art

Other devices for producing oscillating motion are well known in the art. None of these devices however is capable of converting rotating motion into an infinite number of simultaneous oscillations intersecting at a common point.

The only other related art known to this inventor was disclosed in his own U.S. Pat. No. 4,757,722 and involves transforming a drive which both rotates and reciprocates into the type of oscillations just described. In the just cited patent the oscillations are generated by the motions of selected points on the surface of a rotating/precessing ball-shaped body. Selected points are located by drawing imaginary lines from the circumferential edge of a rotating/revolving drive wheel located below the ball-shaped body through the center of the ball-shaped body. All possible selectable points lie in a circle superimposed on the surface of the ball-shaped body. This implies that a circular or disk-shaped body can be substituted in place of the ball-shaped body.

Some of the advantages which the disk-shaped body has over the ball-shaped body of the original invention known as a Motion Conversion Apparatus, is that the new disk-shaped body is much more compact and is capable of continuously varying the degrees of arc for an infinite number of arcs which intersect at a common point from an infinite number of angles whereas the previously mentioned ball-shaped body is capable of continuously varying the degrees of arc for only two arcs intersecting at right angles.

SUMMARY OF THE INVENTION

In the first preferred embodiment of the invention, rotating motion is supplied by a cylindrical drive shaft. The end of the drive shaft which is remote from the motor means is provided with a bend, such bend having an angle less than 90 degrees from an imaginary line corresponding to the axis of rotation of the drive shaft. A body, preferably disk-shaped, is rotatably mounted on the tip of the bent end of the drive shaft by providing the disk-shaped body with a hollow cylindrical fitting which is fixed to the disk-shaped body so that one end of the hollow cylindrical fitting is oriented perpendicular to the plane of the circumference of the disk-shaped body and centered over the point of intersection of the diameters of the disk-shaped body. The hollow cylindrical fitting has an internal diameter that allows it to slide around the drive shaft. A ring gear is fixed to the outside of the hollow cylindrical fitting so that the hollow cylindrical fitting and disk-shaped body rotate in response to the ring gear being swept around a slip-free circular path. The drive shaft is bent at a selected distance and angle so that the circumferential edge of the disk-shaped body always intersects a point on the imaginary line which is coaxial with the axis of rotation of the drive shaft. The ring gear has an external diameter which measures exactly half the diameter of the aforesaid slip-free circular path. Because of the direct relationship of circumference to diameter according to the formula "circumference is equal to pi times diameter", the ring gear and attached disk-shaped body will rotate twice as they are swept about the slip-free circular path once. In so doing any arbitrarily selected point on the circumferential edge of the disk-shaped body will describe one period of arc. A second point on the circumferential edge of the disk-shaped body diametrically opposite the first arbitrarily selected point will describe a second arc which is perpendicular to the arc described by the first point. A third point and a fourth point on the circumferential edge of the disk-shaped body midway between the first two points describe arcuate vectors which bisect the angles formed by the first pair of arcuate vectors. Any number of arcuate vectors can be obtained at any angle of intersection simply by selecting appropriate points on the circumferential edge of the disk-shaped body. The infinite number of points on the circumferential edge of the disk-shaped body will describe an infinite number of arcs all intersecting at a common point from an infinite number of angles.

Since it is intended to enhance the function of a variety of devices by attaching them onto the disk-shaped body and since many of these oscillating devices are electrical, the preferred embodiment is provided with a hollow drive shaft, a disk-shaped body, and mounts for containing electrical wiring for said devices. Alternate means of electrification across the rotating electrical junctions occurring between the electrical source and the drive shaft and between the drive shaft and the rotating disk-shaped body include brushes and ring contacts, electrical to optical converters, and mechanisms for transmitting light to photoelectric panels. Microwaves and magnetic induction can also be employed.

In a second embodiment of the invention, the degrees of arc described by the infinite number of points on the circumferential edge of the disk-shaped body can be continuously varied. In this second embodiment, the disk-shaped body is mounted on a movable arm which maintains the altitude of the disk-shaped body at its point of intersection with the imaginary line which is coaxial with the axis of rotation of the drive shaft while varying the position of the base of the disk-shaped body towards or away from the drive shaft. In the preferred form of this second embodiment the movable arm is curved. The curved shape of the movable arm conforms to an arc segment of an imaginary circle whose center is the point of intersection of the altitude of the disk-shaped body and the imaginary line which is coaxial with the axis of rotation of the drive shaft. The movable arm is slidably mounted on the drive shaft by providing a curved first aperture in the drive shaft. This curved first aperture has the size, shape and orientation to allow the movable arm to slide through the central axis of the drive shaft as a movable arc of the imaginary circle. The movable arm is provided with an abutment fixed to one of its ends, said abutment being fixed to the movable arm in the same plane as the aforesaid movable arm. The abutment is spaced at a greater distance from the center of the imaginary circle than the movable arm.

The abutment is provided with a hollow cylindrical orifice over which the disk-shaped body is rotatably mounted about its center by means of a flexible splined driven shaft, one end of which is fixed to the rotatable disk-shaped body perpendicular to the center of said body. The flexible splined driven shaft courses through a second aperture in the drive shaft. This second aperture is parallel to the first aperture housing the aforesaid curved movable arm. In this second embodiment the flexible splined driven shaft is rotated by means of a ring gear provided with internal splines which accurately fit the spline grooves of the driven shaft. The ring gear is swept around a slip-free circular path by the drive shaft. The ring gear has an external diameter measuring exactly half the diameter of the circular path causing the disk-shaped body to be rotated twice for each revolution around the circular path. Thus the infinite number of points on the circumferential edge of the disk-shaped body pass through a common point of intersection regardless of the change in angle of inclination of the disk-shaped body. The degrees of arc described by the arcuate vectors of the points on the circumferential edge of the disk-shaped body are determined by the acute angle formed by the disk-shaped body and the aforesaid imaginary line. Increasing the speed of rotation of the drive shaft increases the centrifugal force acting on the disk-shaped body, thus causing an increase in the just described acute angle and thereby reducing the degrees of arc for the infinite number of arcuate vectors. In the case of a tracking system this second embodiment would provide a logical transition from low-speed wide-angle scanning to high-speed narrow-angle tracking. The invention is provided with a system of centrifugal counterweights consisting of a series of beads which are threaded over a guide, said counterweight guide resembling an arc segment of an imaginary circle. The counterweight guide is fixed to the drive shaft at one end. This counterweight guide is continuous with the aperture containing the flexible splined driven shaft and is on the side of the drive shaft opposite from the disk-shaped body. The tail end of this flexible splined driven shaft is housed inside the hollow counterweight guide. The drive shaft, curved movable arm, abutment and disk-shaped body are all provided with hollow passages for electrical and other utilities which may be used in specific applications.

In a third embodiment a freely rotatable ball-shaped body is centered on the aforesaid imaginary line which is coaxial with the axis of rotation of the drive shaft. In the preferred form of this third embodiment the ball-shaped body is made to oscillate in an infinite number of directions by means of two linkages attached to the aforesaid disk-shaped body which are each made to rotate 360 degrees over the course of one period of oscillation. The linkages are each joined by one end to diametrically opposite sides of the disk-shaped body by means of hinge joints. The hinge joints are oriented so that the linkages are able to swing in the direction of the center of the diameters of the disk-shaped body. Each of the hinges is rotatably joined to the disk-shaped body by means of a rotatable pin introduced perpendicularly through the circumferential edge into the disk-shaped body. The opposite ends of the two linkages are fixed to the ball-shaped body so that the longitudinal axes of the two linkages intersect through the center of the ball-shaped body. Because the distance between the hinge points of the aforesaid linkages and the center of the ball-shaped body is constantly changing as the hinge points move to and fro underneath the ball-shaped body, the linkages are provided with telescoping sections to accommodate the change in distance. Movement of the disk-shaped body rotates points on the surface of the ball-shaped body in an infinite number of direction, thus making the surface of the ball-shaped body an ideal grinding surface. Providing the ball-shaped body with a hollow interior makes it an ideal mixing chamber. Such a hollow interior can also be used to contain an independent power supply and other utilities for devices mounted on the ball-shaped body.

In a variation of this third embodiment, a rod-shaped body is rotated as a two-spoke wheel and can be substituted for the disk-shaped body. This illustrates the fact that for all intents and purposes the presence of spokes and a hub can be considered as the logical and practical equivalent of a disk-shaped body. This also illustrates the principle that the outer tips of the rod-shaped body can be considered as the logical and practical equivalents of the circumferential edge of the disk-shaped body.

In a fourth embodiment a portion of a sphere is substituted for the ball-shaped body and the disk-shaped body is attached directly to it. In the preferred form of this embodiment the circumferential edge of the disk-shaped body is fixed to the interior surface of a hollow hemispherical body parallel to the circumferential edge of the hemispherical body. The hollow hemispherical body has a radius center located on the imaginary line which is continuous with the axis of rotation of the drive shaft. Movement of the disk-shaped body rotates points on the surface of the hemispherical body in an infinite number of directions, thus making the surface of the hemispherical body an ideal grinding surface.

In a fifth embodiment intersecting guides are substituted for the gearing and path defining means. Since all points on the circumferential edge of the disk-shaped body oscillate within fixed arcuate paths, the paths followed by selected points on the circumferential edge of the disk-shaped body can be defined by such means as arcuate channels. Such channels can serve as guides for caster mountings which are fixed to the disk-shaped body at those selected points. This illustrates the fact that for all intents and purposes the intersecting guides can be considered as the logical and practical equivalents of the gearing means because the intersecting guides provide two periods of rotation to the disk-shaped body over the course of one period of revolution of the disk-shaped body around the central longitudinal axis. It is also understood that the end points of an infinite number of intersecting guides or channels comprise a circle. These end points of the intersecting guides can be considered as logical and practical equivalents of the circular path. In the preferred form of this fifth embodiment cylindrical arms are attached to selected points on the circumferential edge of the disk-shaped body and the end of each of the cylindrical arms rotates and oscillates inside a recess provided in the underside of a caster. Each caster is provided with a mounting for a device. This design eliminates the need for devices mounted on the casters to undergo rotation as they are oscillated.

An alternate design which eliminates the requirement for devices to undergo rotation as they are oscillated is the provision for axially rotatable mountings for devices attached to selected points on either the circumferential edge of the disk-shaped body or the ball-shaped body.

In a sixth preferred embodiment, a new and useful circuit pathway is introduced which continuously and unidirectionally shifts the circuitry lengthways around the drive shaft. This is accomplished in its preferred form by enclosing the portion of the drive shaft which is between the motor and the disk-shaped body inside a jacket. The jacket is composed of three sections. The first of the three sections of the jacket housing the drive shaft is an extended form of the aforesaid hollow cylindrical fitting which is in turn fixed to the disk-shaped body. A second section composed of a flexible/torquable material, such as a helical coil, encloses the portion of the drive shaft which is provided with a bend. The third section housing the portion of the drive shaft which is between the bend and the motor is again jacketed by means of a rigid cylinder. A space is provided between the jacket and the drive shaft by means of bushings to provide clearance for circuitry to be attached to the inside of the jacket, said circuitry running the length of the jacket. Rotation of the ring gear rotates the jacket and circuitry around the drive shaft. The electrical circuit is completed by means of brushes attached to the outside of the third section of the jacket. As the brushes are swept about the drive shaft, the ends of the brushes are in constant contact with a fluidic electric conductor such as mercury contained within ring-shaped reservoirs. The internal diameter of each ring-shaped reservoir is made large enough to allow either the drive shaft or the jacket or both to turn freely within it. Such a fluid can be contained within the reservoir in the absence of gravity by placing the opening of the reservoir traversed by the brush along the inside diameter of the ring-shaped reservoir facing the outside diameter of the jacket. The fluid would then be contained by the centrifugal force imparted to it by the movement of the brush around the inside of the reservoir.

An alternate electrical contact device could involve the substitution of an electrically conducting wheel in place of each brush. This wheel would rotate in contact with an annular surface having an internal diameter large enough to allow either the drive shaft or the jacket or both to turn freely within it.

The same design can also be used to provide non-electric circuits such as fluid circuits. In this application fluid conduits are mounted inside the jacket along the length of the jacket, each conduit having one end in contact with the fluid contained in the ring-shaped reservoir for the purpose of conducting such fluid between the ring-shaped reservoir surrounding the jacket and the oscillating devices mounted on the disk-shaped body. One intrinsic pumping mechanism could be inflow scoops mounted on the ends of the submerged conduits to force fluid through the conduits. Another intrinsic pumping mechanism includes the use of capillary tubing within the conduit. A third intrinsic mechanism includes winding the conduit around the inside of the jacket in the shape of a helical coil so that it makes use of the principle of Archimedes' Screw to transport fluid materials from the reservoir to the disk-shaped body. A fourth intrinsic mechanism includes siphon effects as the fluid is dispensed centrifugally by devices provided with outlets mounted on the circumferential edge of the disk-shaped body. The same principle applies to the movement of solid materials provided that such solid bodies are small enough to pass through the conduit.

The usefulness of this circuit pathway is that it reduces the number of electrical contacts and in addition provides an uninterrupted fluid circuit.

It is recognized by the inventor that alternate forms of conveying materials between the ring-shaped reservoirs and the disk-shaped body exist, such as electric pumps and conveyer belts. It is also recognized that other forms of flexible/torquable jackets can be substituted, such as sections of rigid pipe joined end to end by universal joints, said universal joints each being provided with a hole made perpendicular to the plane of its arms at the center, said hole being made large enough to allow the universal joints to rotate freely around the drive shaft.

The intent of the inventor is not altered by other means for transmitting the proper gear ratio to the disk-shaped body, such as pulleys or separate synchronized motors for the drive shaft and disk-shaped body. The intent of the inventor is also not altered by alternate means for varying the angle of inclination of the disk-shaped body, such as electric motors, hydraulics, or movable support devices for varying the angle of inclination of the ring gear. Furthermore, the intent of the inventor is not altered by a variety of other centrifugal or counterweight systems, or by other means of driving the ball-shaped body, such as magnetic linkages between the circumferential edge of the inclined disk-shaped body and the ball-shaped body, or by substitutions of energy fields such as a magnetic field for body means.

BRIEF DESCRIPTION OF THE DRAWINGS

FIG. 6 is a cross-sectional side elevational view of the fifth preferred embodiment.

FIG. 7 is a top plan view of the fifth preferred embodiment.

DETAILED DESCRIPTION OF THE PREFERRED EMBODIMENTS

Figure 1:
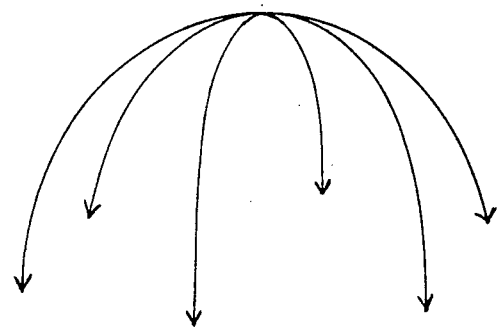
FIG. 1 is a schematic perspective view showing the vectors of three symmetrically spaced points on the circumferential edge of the disk-shaped body.
Figure 2:
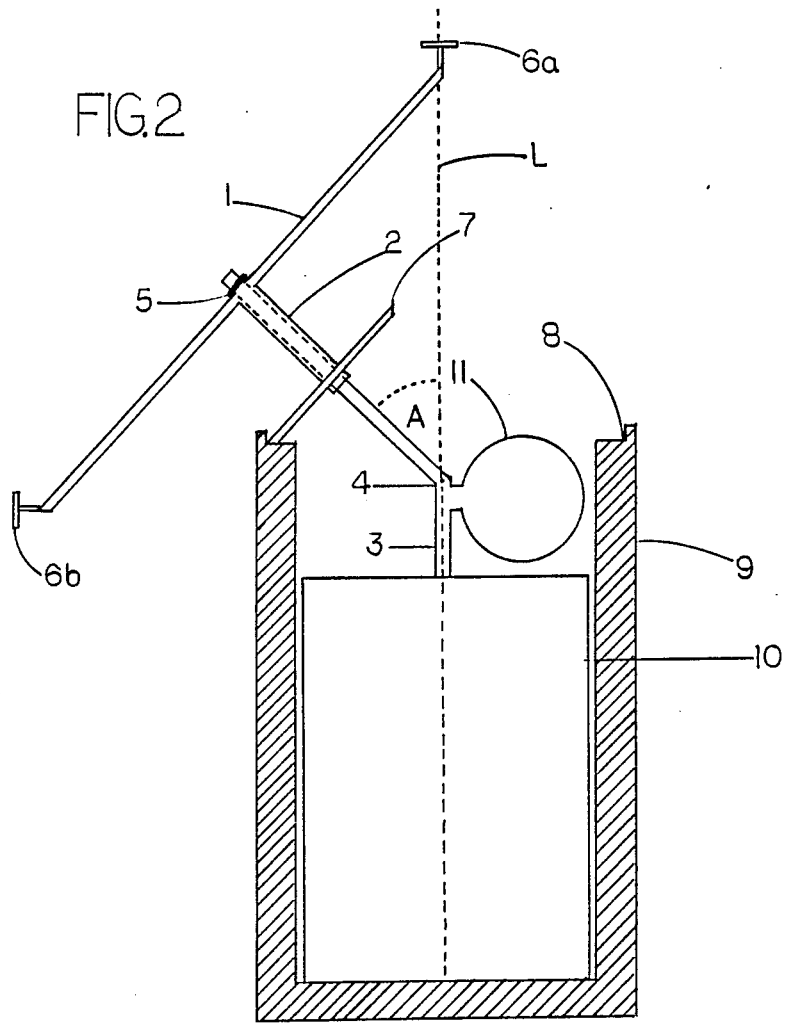
FIG. 2 is a cross-sectional side elevational view of the first preferred embodiment.

In the first embodiment shown in FIG. 2, a disk-shaped body 1 is provided with a hollow cylindrical fitting 2 which is fixed at one end to the disk-shaped body 1. This fitting 2 is oriented perpendicular to the plane of the circumference of the disk-shaped body 1 and is centered over the point of intersection of the diameters of the disk-shaped body 1. The disk-shaped body 1 is rotatably mounted on a drive shaft 3, provided with a bend 4, having an angle A less than 90 degrees from an imaginary line L. This imaginary line L is continuous with the axis of rotation of the drive shaft 3. The drive shaft 3 has a diameter that allows it to slide inside the hollow cylindrical fitting 2. The rotatably mounted disk-shaped body 1 is held in place by means of a snap ring 5 fastened to the tip of the bent end of the drive shaft 3. Mounts 6a and 6b for devices (not shown) are fixed to the circumferential edge of the disk-shaped body 1. A ring gear 7 is fixed to the outside of the rotatably mounted hollow cylindrical fitting 2, rotating said hollow cylindrical fitting 2 and said disk-shaped body 1, in response to its being swept in a circle within a slip-free path 8. The slip-free path 8 is supported by a housing 9 containing a motor 10, said motor 10 turning the drive shaft 3 which is stabilized by a counterweight 11.

Figure 3:
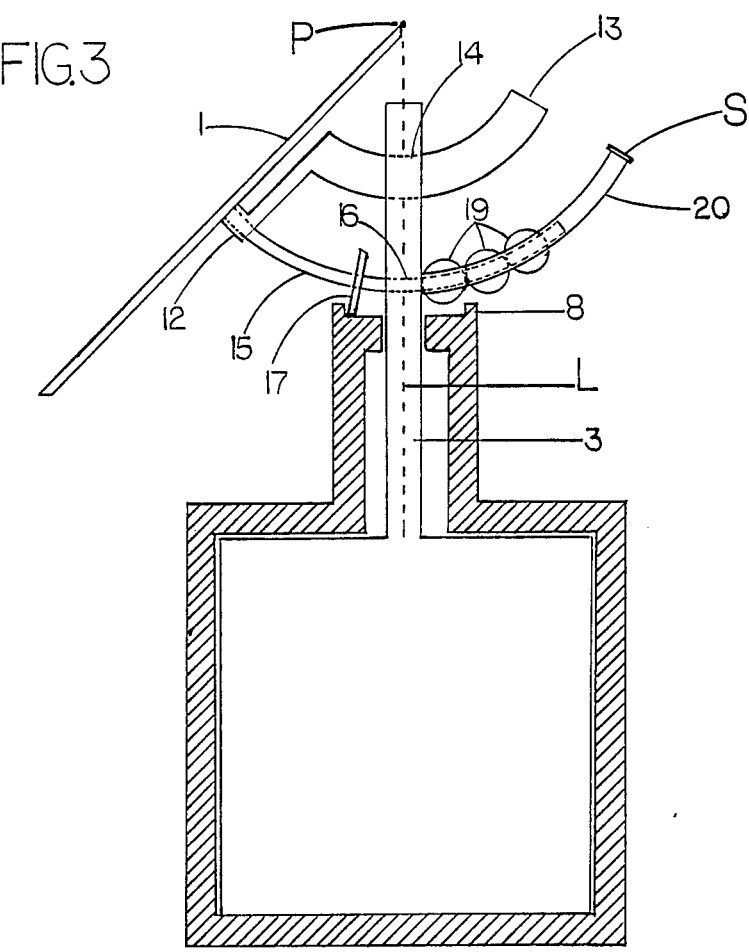
FIG. 3 is a cross-sectional side elevational view of the second preferred embodiment.

FIG. 3 is a cross-sectional side elevational view of the preferred form of the second embodiment showing the disk-shaped body 1 supported on an abutment 12 which is attached to a movable arm 13. This arm 13 slides through a first curved aperture 14 in the drive shaft 3. The movable arm 13 maintains the circumferential edge of the disk-shaped body 1 at its point of intersection P with the imaginary line L while varying the angle of inclination of the disk-shaped body 1 with the drive shaft 3. A flexible splined driven shaft 15 passes through a second curved aperture 16 in the drive shaft 3. This second curved aperture 16 is formed as an arc segment parallel to the first curved aperture 14. A ring gear 17 with internal splines rotates the flexible splined driven shaft 15 by being swept about the slip-free circular path 8 which has a diameter exactly twice the diameter of the ring gear 17. Movable counterweights in the form of beads 19 are strung on a curved hollow counterweight guide 20 which also houses the flexible splined driven shaft 15. A stop S for movable counterweights 19 is fixed to the free end of the curved hollow counterweight guide 20.

Figure 4:
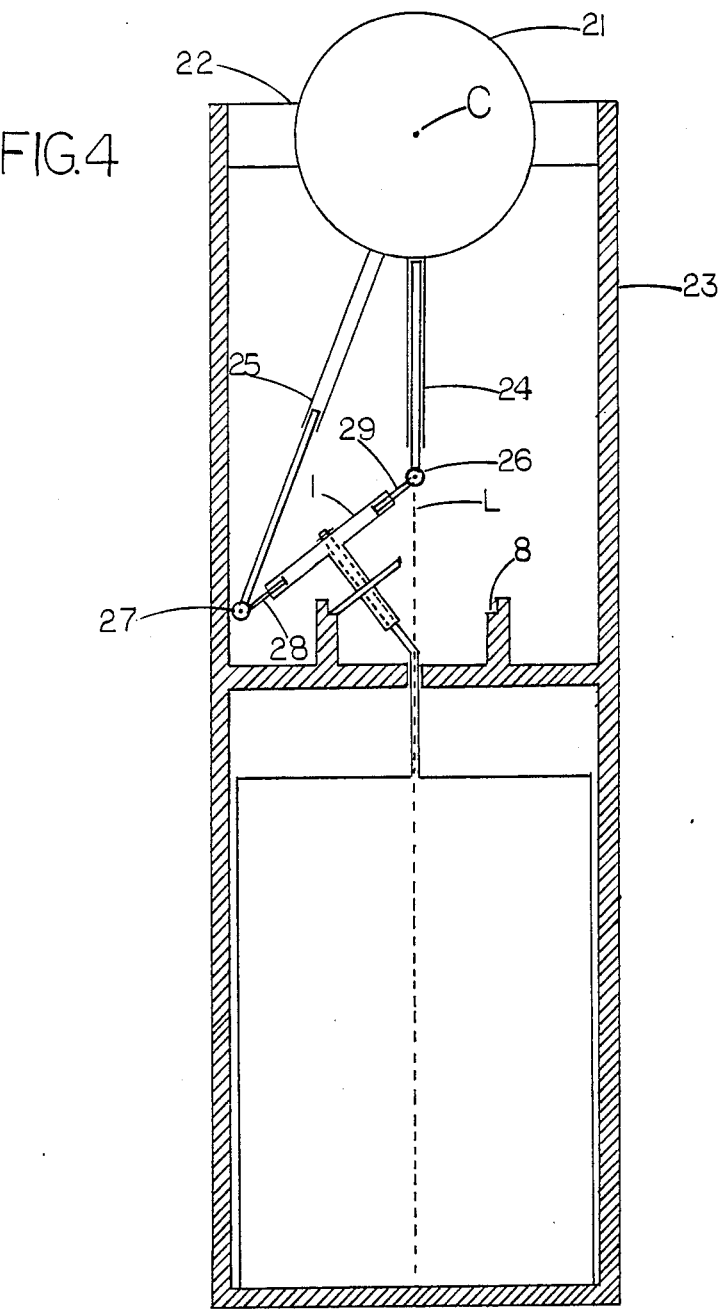
FIG. 4 is a cross-sectional side elevational view of the third preferred embodiment.

FIG. 4 is a cross-sectional side elevational view of the preferred form of the third embodiment showing the imaginary line L on which the circumferential edge of the disk-shaped body 1 and the center C of the ball-shaped body 21 are located. The ball-shaped body 21 is freely rotatable within a socket 22. The socket 22 is positioned by a support 23. The ball-shaped body 21 is connected to the disk-shaped body 1 by two linkages 24 and 25 which are fixed to the surface of the ball-shaped body 21 so that the longitudinal axes of the linkages 24 and 25 intersect through the center C of the ball-shaped body 21. The opposite ends of the linkages 24 and 25 are joined to diametrically opposite points on the circumferential edge of the disk-shaped body 1 by means of hinge joints 26 and 27. The hinge joints 26 and 27 are joined to the circumferential edge of the disk-shaped body 1 by means of pins 28 and 29 which are freely rotatable within the disk-shaped body 1 and positioned diametrically opposite each other.

Figure 5:
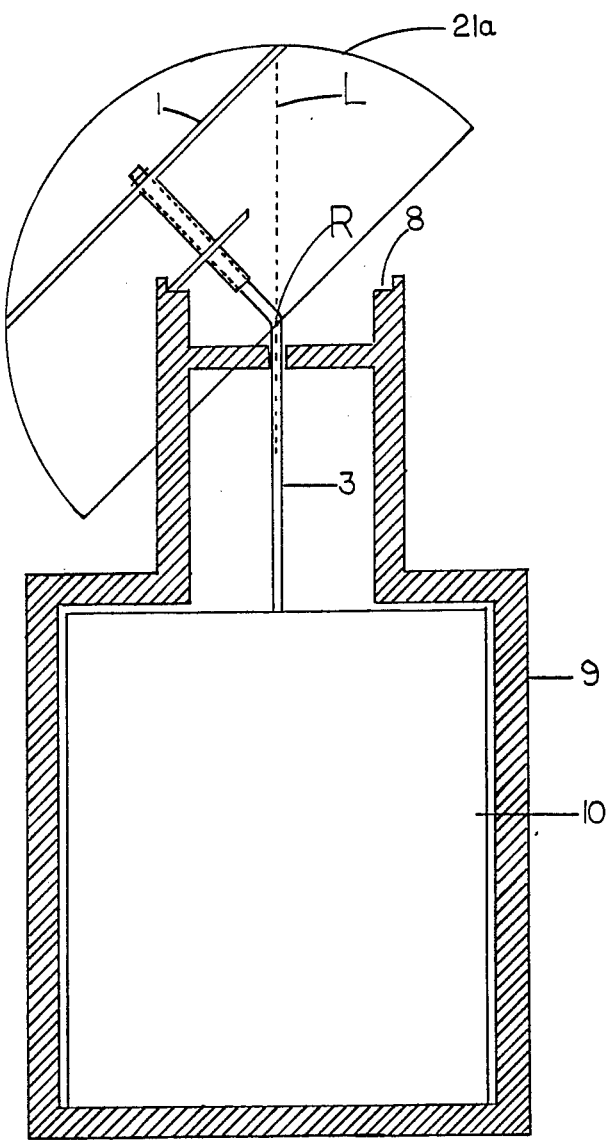
FIG. 5 is a cross-sectional side elevational view of the fourth preferred embodiment.

FIG. 5 is a cross-sectional side elevational view of the preferred form of the fourth embodiment showing the disk-shaped body 1 fixed to the interior of a hemispherical body 21a. The hemispherical body 21a has a center of rotation R located on the imaginary line L which is continuous with the axis of rotation of the drive shaft 3.

FIG. 6 is a cross-sectional side elevational view of the fifth preferred embodiment. Two cylindrical arms 30a and 30b are shown attached to the circumferential edge of the disk-shaped body 1 inside a hollow spherical body portion 21b. The opposite ends of each of the arms 30a and 30b is freely rotatable inside a cylindrical orifice 31a and 31b provided in the underside of casters 32a and 32b. Each of the casters 32a and 32b is also provided with a mounting 33a and 33b for the attachment of devices (not shown).

FIG. 7 is a top plan view of the same fifth preferred embodiment showing two open arcuate channel guides 34a and 34b cut in the spherical body portion 21b. The casters 32a and 32b are shown bridging sides of the open arcuate channel guides 34a and 34b which intersect each other perpendicularly. The disk-shaped body 1 is shown inside the spherical body portion 21b in relation to the casters 32a and 32b.

Figure 8:
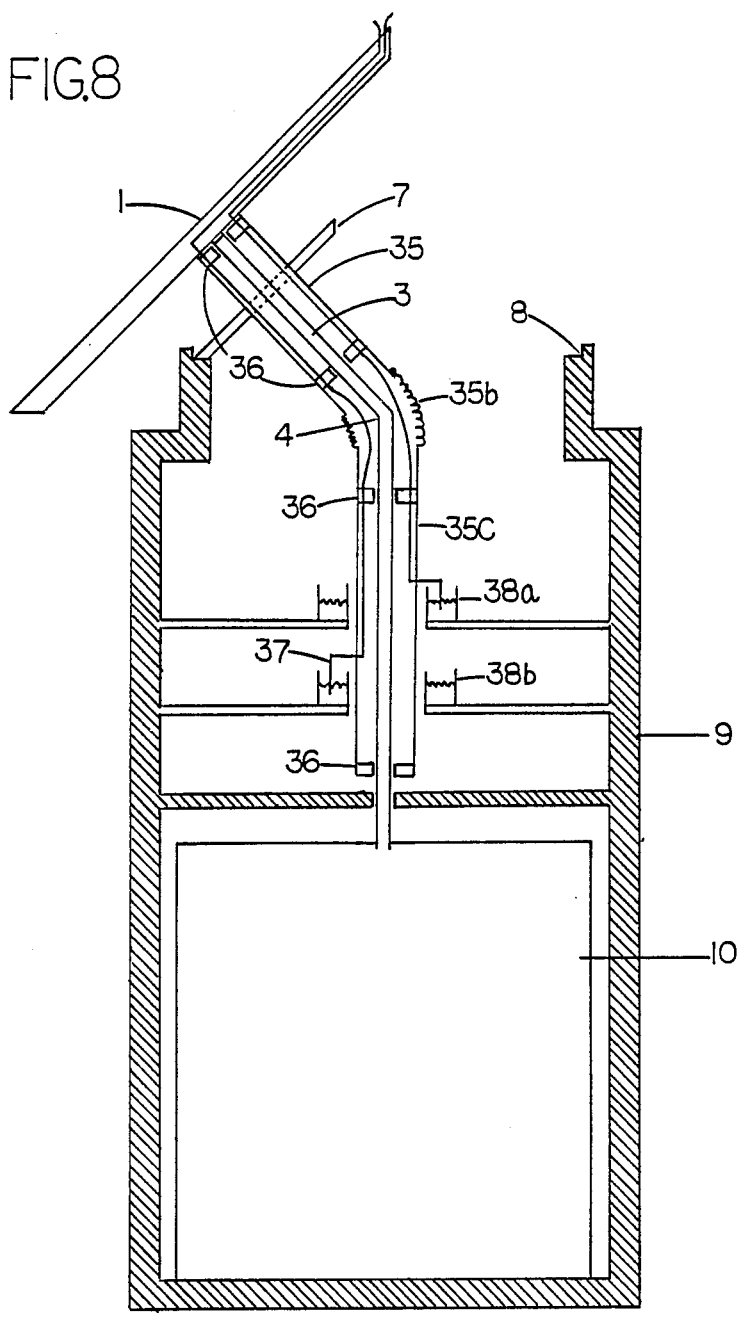
FIG. 8 is a cross-sectional side elevational view of the sixth preferred embodiment.

FIG. 8 is a cross-sectional side elevational view of the preferred form of a jacket 35 embodying a continuous circuit path. A portion of the drive shaft 3 is surrounded by the jacket 35. A middle section 35b of the jacket 35 is composed of a flexible/torquable helical coil and is shown in relation to the bend 4 in the drive shaft 3. Bushings 36 are shown at spaced intervals between the jacket 35 and the drive shaft 3. A ring gear 7 is attached to the outside of the jacket 35. An electrical conductor or wiring circuit 37 (here limited to one for purposes of illustration) is attached to the inside of the jacket 35 and runs the length of the jacket 35. Ring-shaped fluid reservoirs 38a and 38b (here limited to two for purposes of illustration) surround the jacket 35 and the drive shaft 3.

The capabilities of this invention result in improvements in a number of existing mechanisms including; pendulum devices such as grandfather clocks, metronomes, centrifuges, assembly lines and distribution systems; dispersion systems such as fluid dispersion, signal lighting, laser and ballistic ordnance; detection systems such as thermal, radiation, optical and polarographic detectors; scanning devices such as ultrasonic, x-ray, radar and computer memory scanning (and encoding); cutting and abrading systems such as engravers, erasers, scrubbers, grinders, drills and electric shavers; motorized omnidirectional articulated joints such as robot appendages and rocket motors; homogenizing systems such as mixers, beaters, blenders and stirrers; various kinds of chambers such as energy bombardment chambers such as microwave ovens, constant flow decanting chambers and disorientation chambers; health care products such as massagers and retinal stimulators; entertainment systems such as amusement rides and toys; and educational models.

The improvement in pendulum devices such as grandfather clocks and metronomes allows any number of pendulums to swing from a single point source and intersect through a common point at any angle allowing easy viewing from a variety of spatial orientations and providing an aesthetic component to the viewing. The invention can also be considered a kinetic sculpture.

The improvement in centrifuges applies especially to centrifugal cell washers. By attaching the ends of test tubes to the circumferential edge of the inclined disk-shaped body, the device gently washes organic cell cultures by an interactive combination of acceleration, deceleration, centrifugal force and angular momentum.

The improvement in assembly lines involves putting transfer devices, such as electromagnets, on the ends of pendulum arms. Such a machine is capable of transferring parts from an infinite number of directions to the center line of a conveyer belt. Because it radially addresses an infinite number of points in space, such a device takes less room to operate. Also, because it can theoretically carry out an infinite number of transfer operations simultaneously, the invention can perform more work in less time, thus increasing the efficiency of an assembly line. The machine can also work in reverse as a distribution system by removing objects from a conveyer belt to various collection points. In addition to directing a theoretically infinite number of pendulum arms in an infinite number of directions, the invention can also be used to steer a single motorized articulated appendage, such as a robot arm or rocket motor in an infinite number of directions. This movement can be accomplished by means of a clutch mechanism, such as an electromagnet fixed inside a magnetizable ball-shaped body, capable of engaging one end of the appendage to serially selected points on the outer surface of the ball-shaped body. This engagement is facilitated by providing the end of the appendage which interfaces with the ball-shaped body with a concave magnetizable surface resembling a ball socket.

The improvement in signal lighting creates a highly visible display of lights moving in synchronized intersecting arcs which in addition to being optically stimulating is also aesthetically pleasing, therefore producing a high degree of conscious awareness. Such an array of lights may also have health benefits. The peripheral areas of the retina often remain dormant during extended reading and other highly focused activities. Such dormancy often leads to ocular asymmetry which results in visual impairment. By being held close to the pupil of the eye, the lighting array device stimulates these peripheral areas of the retina.

The improvement in lasers, ballistics, and dispersion systems in general results from their new ability to disperse in a pattern the scope of which can be guaranteed to include the target.

The improvement in detecting systems as applied to thermal, infrared, x-rays and the like results from their new ability to detect in a pattern the scope of which can be guaranteed to include the coordinates of the source of the radiation. The concept can be extended to include photography as a photo detection and mapping system as well. In the preferred form of this and similar applications, the information obtained on each sector scan would be digitally stored and all the scans compiled by a computer into a composite image which can be viewed on a computer monitor. A similar result can be achieved using analogue photo technology by exposing a photographic film or phosphorescent screen line by line. Ideally the film or phosphorescent screen would have a hemispherical shape and the developed images could then be viewed from a variety of perspectives or the image could be projected by an internal light source onto a hemispherical screen, such as are commonly seen in planetariums. Other applications of this device to detecting systems are electromagnetic field mapping, polarographic analyzers and mapping various kinds of diffraction patterns such as those produced by x-ray and optical diffraction. Similarly the device can be used to read encoded information, such as universal product bar codes, in an infinite number of directions. Since encoded information can be radially addressed and read by detectors mounted on the invention, such a detection system may be considered a high-density, high-speed random access computer memory scanner and encoder.

The improvement in scanning systems such as ultrasonic scanners lies in their ability to perform a volume analysis by scanning multiple intersecting sectors simultaneously. Such scan planes can be displayed either serially on one monitor by altering the view plane with a selector switch or simultaneously on multiple monitors. There is in addition the capability to perform a volume analysis by compiling the scan planes on a computer into a three-dimensional composite image.

The improvement in cutting and abrading systems such as grinders, erasers, scrubbers, engravers and the like results from their new ability to apply abrasive or cutting force to a point from an infinite number of directions. It is possible to provide the circumferential edge of the disk-shaped body with a cutting edge that can make a hole by cutting serially in all directions, taking advantage of weaknesses in the grain of materials while dissipating heat from the cutting edge more efficiently than a standard drill bit which concentrates its heat at the tip. By protecting such a cutting edge behind a hemispherical grate, it becomes a unique electric shaver capable of cutting whiskers from all directions. The hemispherical design of the grate when pressed against the skin exposes more of the hair shaft than any current shaver head design. In the case of the third and fourth embodiments where either a ball-shaped body or a spherical body portion is rotated in an infinite number of arcs all intersecting through a common point, this rotation results in improvements in grinding very fine powders between a concave mortar and the outer surface of either a ball-shaped body or a spherical body portion. It is also applicable for grinding concave surfaces such as is used in lens grinding.

The interior of a hollow spherical body, such as is described in the third embodiment, is ideal as a mixing device for gently and efficiently mixing ingredients to a high level of consistency. It is also ideal as a tumbler for polishing spheres and as an energy bombarding chamber for various applications which would be improved by radially symmetrical energy input such as microwave cooking and the excitation of a plasma by means of lasers. Such a chamber can also be used as a constant flow decanter for separating a nonhomogeneous fluid mixture such as milk and butter fat. In this application a large hole is provided in the top of the ball-shaped body and two relatively small diameter pipes are positioned in the hole. One of these pipes delivers the fluid mixture to the decanting chamber and its opening is fixed about half way down in the chamber. The other pipe drains the heavier fluid and is parallel to and in close proximity with the first pipe and its opening is fixed near the bottom of the chamber. The ball-shaped body is provided with a degree of precession that allows the edge of the hole to wobble around the pipes without touching them. The wobbling motion continuously decants the lighter fluid out of the chamber. A continuous flange fixed to the outside of the decanting chamber around the hole spills the decanted fluid into a circular through for collection.

The improvement in homogenizing systems such as mixers, beaters, blenders and stirrers, as exemplified by clothes washing machines is that it churns in an infinite number of directions, thus achieving a high level of consistency in a short period of time. This is accomplished with a minimum amount of impact to those materials since each stroke of the mixing arms has an acceleration and deceleration phase.

In the case of the fifth embodiment where nonrotating oscillating devices are mounted on casters, an exemplary application includes massagers. The improvement in massagers is that it imparts rubbing motion to a selected part of the body in a number of directions. In the preferred form of this application, the casters are provided with rollers to minimize frictional damage to the skin surface.

Other applications of this invention include amusement rides in which personnel compartments are provided along the circumferential edge of the disk-shaped body and inside the ball-shaped body, and educational models and toys which illustrate the functions of this device.

In the second embodiment, the degrees of arc described by the infinite number of points on the circumferential edge of the disk-shaped body can be continuously varied. This results in improved function for many of the devices described in this application. For example in the case of scanning devices, this results in the ability to vary the sampling rate and resolution for an infinite number of intersecting scans. Similarly in the case of dispersing devices, it results in the ability to vary the density of the dispersal for an infinite number of intersecting scans.

Other applications include tandem arrangements of the invention. If for example two of these inventions are outfitted with photo detecting devices and are operated back to back, the result is in effect an all-seeing eye capable of looking in all directions. A space observatory designed in this way would theoretically be capable of observing the entire photo emitting universe at once. Such an observatory can also be equipped with a combination of different kinds of detectors, for example x-ray, radio and infrared radiation detectors. The tandem principle applies generally to the other device applications listed in this disclosure as well as to applications not specifically mentioned.

An additional improvement which applies generally to all device applications is that such devices are impact-protected by acceleration and deceleration phases at the end points of the arc swings.

In a reversal of parts the disk-shaped body can be rotated to rotate the drive shaft.

From the foregoing description it is believed that those skilled in the art will readily appreciate the unique features and advantages of the present invention over previous types of oscillatory mechanisms and adjustable output versions thereof. Furthermore, it is to be understood that while the present invention has been described in relation to particular preferred and alternate embodiments as set forth in the accompanying drawings and as described above, the invention nevertheless is susceptible to change, variation and substitution of equivalents without departing from the spirit and scope of the claims appended hereto. It is therefore intended that the present invention be unrestricted by the foregoing description except as may appear in the following claims.

I claim:

1. A mechanism for transforming continuous unidirectional rotating motion into a plurality of arcuate motions intersecting through a common point, comprising:
   a motor means;
   a rotary drive shaft means having a rotational axis and being operatively connected to the motor means, said rotary drive shaft means supporting a shaft portion which has a longitudinal axis that forms an acute angle with an imaginary line continuous with the rotational axis of the rotary drive shaft means;
   body means being continuously rotated around the longitudinal axis of the shaft portion and also being continuously revolved around said imaginary line; and
   gearing means for providing two periods of rotation of the body means around said longitudinal axis during one period of revolution of the body means around said imaginary line;
   wherein said body means has peripheral points which oscillate through the common point located on said imaginary line.

2. The mechanism in accordance with claim 1 further comprising:
   means, secured to the body means at the peripheral points which oscillate through the common point located on said imaginary line, for mounting devices to said body means, each of said device-mounting means having a central axis passing colinearly through said imaginary line during operation.

3. The mechanism in accordance with claim 1 further comprising:
   a socket means having a radius center positioned along said imaginary line;
   a ball means being rotatably mounted in the socket means; and
   linkage means for connecting the ball means to the body means, said linkage means being pivotally attached at one end to the body means and passing colinearly through said imaginary line during operation, said linkage means further being fixedly attached at an opposite end to the ball means.

4. The mechanism in accordance with claim 1 further comprising:
   a sectional-ball means including a hollow spherical section mounted to the body means and having a radius center positioned at an intersection of said longitudinal axis and said imaginary line.

5. The mechanism in accordance with claim 1 further comprising:
   jacket means being mounted on and rotating with respect to the rotary drive shaft means and the shaft portion.

6. The mechanism in accordance with claim 5 further comprising:
   at least one electrical conductor being fixed to the jacket means at points lying along a given length of the jacket means, said electrical conductor revolving with the jacket means around the rotary drive shaft means and the shaft portion; and
   at least one ring-shaped contact having an internal diameter which allows at least the rotary drive shaft means to rotate freely inside, said ring-shaped contact making continuous contact with one end of the revolving electrical conductor.

7. The mechanism in accordance with claim 1 further comprising:
   movable arm means for varying said acute angle.

8. The mechanism in accordance with claim 7 in which the movable arm means varies said acute angle such that the common point is always located on said imaginary line.

9. The mechanism in accordance with claim 8 in which the peripheral points of the body means oscillate through the common point located on said imaginary line as the movable arm means varies said acute angle during operation.

* * * * *